March 1, 1949.  J. E. ANDERSON  2,462,931
PUMP FOR HYDRAULIC PITCH CHANGING MECHANISMS
Filed April 8, 1943

INVENTOR
John E. Anderson
BY
Charles L. Shelton
ATTORNEY

Patented Mar. 1, 1949

2,462,931

UNITED STATES PATENT OFFICE 2,462,931

PUMP FOR HYDRAULIC PITCH CHANGING MECHANISMS

John E. Anderson, Portland, Conn., assignor to United Aircraft Corporation, East Hartford, Conn., a corporation of Delaware Application April 8, 1943, Serial No. 482,264

7 Claims. (Cl. 103—161)

An object of this invention is to provide a pump especially adapted for use on hydraulically controlled aircraft propellers.

The invention comprises a multi-cylinder pump having cylinders and pistons circumferentially arranged around a common center, and operated by suitable means such as the engine driving the propeller.

The cylinders are supported in an annular supply manifold, or sump rotatable with the propeller hub.

Each cylinder has a radially movable piston, all pistons being reciprocated by a central cam.

Another object of the invention is the provision of improved means for unfeathering the propeller when the engine is not operating.

The individual pumps discharge into an annular manifold which, for convenience, may be supported within the supply manifold.

Other objects and advantages will be apparent from the specification and claims, and from the accompanying drawings which illustrate what is now considered to be a preferred form of the invention.

Figure 1:
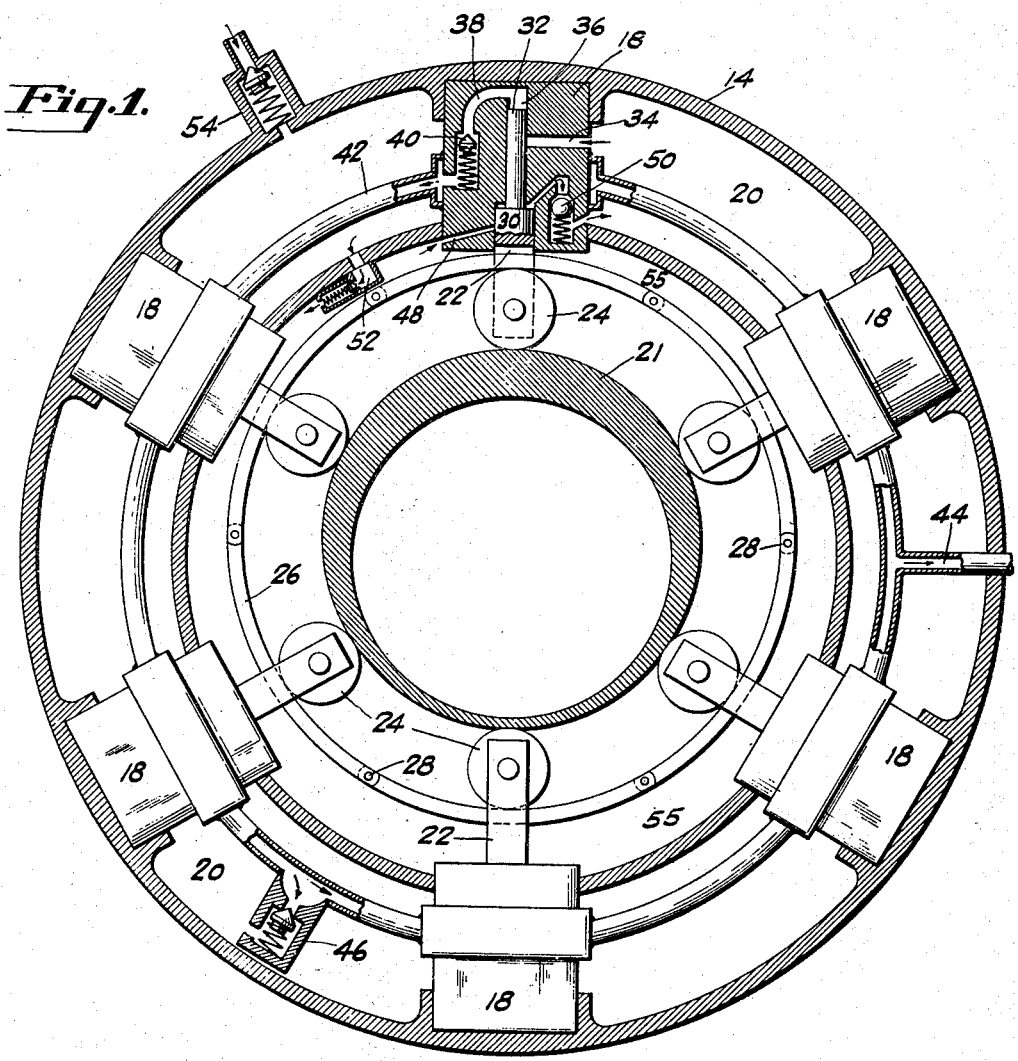
Fig. 1 is largely a diagrammatic cross section of the pump in a plane perpendicular to the axis in rotation.
Figure 2:
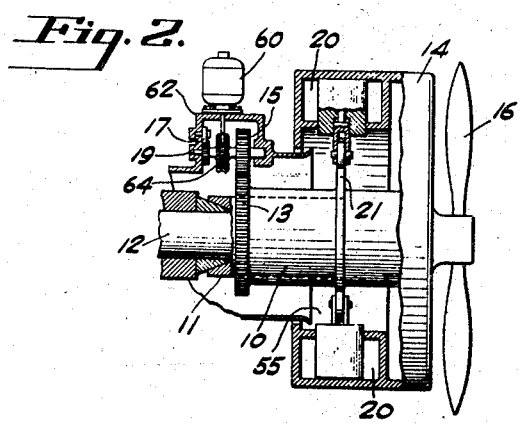
Fig. 2 is a reduced scale of a diagrammatic side view of the invention installed on an aircraft.

The cylindrical pump actuating member 10 is rotatably mounted by means of roller bearings (not shown) on the rear end 11 of the propeller hub 14. The propeller 16 and hub 14 are driven from the engine (not shown) by the drive shaft 12.

Gear teeth 13 on member 10 engage gear 15 which is prevented from being rotated in one direction only by the engine by latch 17 which engages with the teeth of gear 19. Thus when the engine is rotating the propeller and hub, pump operating member 10 is stationary.

The member 10 is provided with an eccentric cam in the form of flange 21. The propeller hub 14 rotates with propeller 16 and supports the six individual pump units 18 and the sump 20 from which the units draw their supply of oil.

Each piston 22 has a roller 24 bearing on the outer surface of eccentric 21, and a ring 26 keeps the rollers in contact with the cam against the suction pull of the pistons and against centrifugal force. For assembly purposes, ring 26 may be made in sections joined as at 28. Each pump piston has two different diameters, a comparatively large diameter 30 for low pressure, and a comparatively small diameter 32 for high pressure.

When the high pressure piston 32 moves radially inwardly sufficiently to uncover inlet passage 34 in pump body 18, oil will flow from sump 20 through passage 34 into high pressure cylinder 36, and on the out stroke the oil will be forced through passage 38 and check valve 40 into discharge manifold 42, from which it will pass through passage 44 to the control valves of the propeller.

A safety valve 46, discharging into sump 20, maintains a comparatively high pressure in manifold 42, for instance 3000 pounds per square inch.

The large diameter part 30 of each pump piston serves to scavenge the lubricating oil and all leakage that may collect within the pump trough 55, drawing the oil through inlet 48 and forcing it into sump 20 past check valve 50. This pump has capacity enough to pump air if necessary. The pressure in sump 20 may be relieved through safety valve 52 at comparatively low pressure, for instance twenty-five pounds per square inch.

Lubricating oil which is under pressure from the propeller hub returns to sump 20 through check valve 54, which may be set at about thirty-five pounds per square inch.

Only one pump unit has been described but it will be understood that the other units work in similar manner all drawing oil from sump 20 and discharging through manifold 42.

Thus it will be seen that when the engine is driving the propeller the pumps 18 will rotate about the stationary eccentric 21 to provide high pressure oil through passage 44 for feathering and unfeathering the propeller.

It is also desired to provide means for unfeathering the propeller in the event the engine is inoperative. This is accomplished by means of electric motor 60 which is mounted on bracket 62 fixed to the engine nose. The motor 60 may be energized to rotate pump actuating member 10, through worm drive 64 and gears 15 and 13, and hence cause eccentric 21 to rotate relatively to the now stationary pumps 18 and provide high pressure oil for unfeathering the propeller.

I claim:

1. A pump comprising a stationary cam, a first manifold surrounding said cam, another manifold within said first manifold, pump units supported by said first manifold and operable by rotation of said manifolds around said cam for drawing fluid from one of said manifolds and discharging it into said other manifold.

2. The invention set forth in claim 1 in which pressure controlled means inter-connects said manifolds, for limiting the fluid pressures in said other manifold.

3. A pump comprising a stationary cam, an annular manifold surrounding said cam, and plunger-pump units supported by said manifold, each of said plungers having a roller in contact with said cam, said plungers being radially operable by rotation of said manifold around said cam, and means comprising a ring surrounding said rollers for maintaining said rollers in operative contact with said cam against the action of centrifugal force.

4. A pump comprising a stationary cam, a manifold surrounding said cam and having an inner surface forming a trough around said cam and spaced therefrom, pump units supported by said manifold and means operatively connecting said pump units and said cam whereby rotation of said manifold around said cam causes said units to pump oil from said trough into said manifold.

5. A pump comprising a stationary cam, an annular sump surrounding said cam and having an inner surface forming a trough around said cam and spaced therefrom, pump units supported by said sump, a discharge manifold within said sump, each pump having a two-diameter plunger of which the larger diameters pump fluid from said trough into said sump and the smaller diameters pump from said sump into said manifold, said plungers being operable by rotation of said sump around said cam.

6. A pump adapted for attachment to the hub of a variable pitch propeller; said pump comprising a stationary cam, a sump surrounding said cam and having an inner surface forming a trough around said cam and spaced therefrom, a manifold within said sump, pump units mounted on said sump, said units being operable by rotation of said sump around said cam for pumping from said trough into said sump, and from said sump into said manifold, in combination with pressure controlled devices interconnecting said sump, said trough, said manifold and said hub, substantially as described.

7. A pump comprising a stationary cam, means connecting said cam with a non-rotatable element to prevent rotation of said cam, a sump surrounding said cam and having an inner surface forming a trough around said cam and spaced therefrom, pump units supported by said sump, a discharge manifold within said sump connected with discharge ports of said pumps, means operatively connecting said pump units and said cam, and means for rotating said sump about said cam to cause said units to pump oil from said trough into said sump and from said sump into said manifold.

JOHN E. ANDERSON.

REFERENCES CITED

The following references are of record in the file of this patent:

UNITED STATES PATENTS

| Number | Name | Date |
|---|---|---|
| 955,464 | Lacour | Apr. 9, 1910 |
| 982,632 | Prather | Jan. 24, 1911 |
| 1,023,685 | Rurvell | Apr. 16, 1912 |
| 1,874,010 | Hess | Aug. 30, 1932 |
| 2,023,785 | Hoover | Dec. 10, 1935 |
| 2,279,645 | Sinclair | Apr. 14, 1942 |
| 2,307,102 | Blanchard et al. | Jan. 5, 1943 |
| 2,317,636 | Parker | Apr. 27, 1943 |

FOREIGN PATENTS

| Number | Country | Date |
|---|---|---|
| 366 337 | France | 1906 |